United States Patent
Seder et al.

(10) Patent No.: US 10,474,289 B2
(45) Date of Patent: Nov. 12, 2019

(54) TOUCHSCREEN PANEL WITH HEATING FUNCTION

(71) Applicant: GM GLOBAL TECHNOLOGY OPERATIONS LLC, Detroit, MI (US)

(72) Inventors: Thomas A. Seder, Warren, MI (US); James A. Carpenter, Rochester Hills, MI (US); William E. Conway, Birmingham, MI (US); Reno V. Ramsey, Sterling Heights, MI (US); Davide Silvestri, Macomb, MI (US); George Degener, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 15/093,019

(22) Filed: Apr. 7, 2016

(65) Prior Publication Data
US 2017/0293386 A1 Oct. 12, 2017

(51) Int. Cl.
*G06F 3/041* (2006.01)
*G06F 3/044* (2006.01)
*G02F 1/1333* (2006.01)
*B60K 37/06* (2006.01)
*G02F 1/13* (2006.01)

(52) U.S. Cl.
CPC .......... *G06F 3/04164* (2019.05); *B60K 37/06* (2013.01); *G02F 1/132* (2013.01); *G02F 1/13338* (2013.01); *G02F 1/133382* (2013.01); *G06F 3/044* (2013.01); *G06F 3/0416* (2013.01); *G06F 3/0443* (2019.05); *G06F 3/041662* (2019.05); *B60K 2370/141* (2019.05);
(Continued)

(58) Field of Classification Search
CPC ....... G06F 3/0416; G06F 3/0412; G02F 1/132
USPC .................................................. 345/156, 173
See application file for complete search history.

(56) References Cited

U.S. PATENT DOCUMENTS

| 7,852,323 B2 * | 12/2010 | Parkinson | B60K 35/00 178/18.05 |
| 2006/0262258 A1 * | 11/2006 | Wang | G02F 1/133555 349/117 |

(Continued)

FOREIGN PATENT DOCUMENTS

JP 2006201575 A * 8/2006

OTHER PUBLICATIONS

English translation of JP-2006201575-A (Year: 2006).*

*Primary Examiner* — Nathan Danielsen
(74) *Attorney, Agent, or Firm* — Quinn IP Law

(57) ABSTRACT

A touchscreen panel is configured to accept an input touch command. The touchscreen panel includes a liquid crystal display (LCD) layer. The touchscreen panel also includes a touch sensor having a receiving element and a transmitting element, each arranged on the LCD layer. The receiving element and the transmitting element together are configured to detect an impending touch of the touch sensor via a hover system and a touch event in a touch-detecting mode. At least one of the receiving element and the transmitting element is configured to operate in a heating mode, as a heating element, when the impending touch of the touch sensor is not detected. The resultant heating element generates a heat energy input to the LCD layer and accelerates responsiveness of the LCD layer to the touch event. A method of controlling a touchscreen panel is also disclosed.

20 Claims, 3 Drawing Sheets

(52) U.S. Cl.
CPC .... *B60K 2370/1438* (2019.05); *G06F 3/0412* (2013.01); *G06F 2203/04108* (2013.01)

(56) References Cited

U.S. PATENT DOCUMENTS

| | | | |
|---|---|---|---|
| 2009/0195512 A1* | 8/2009 | Pettersson | G06F 3/016 345/173 |
| 2010/0123675 A1* | 5/2010 | Ippel | G06F 3/044 345/173 |
| 2011/0007021 A1 | 1/2011 | Bernstein et al. | |
| 2011/0273404 A1* | 11/2011 | Noma | G02F 1/13338 345/175 |
| 2012/0050210 A1* | 3/2012 | King | G06F 3/0416 345/174 |
| 2014/0028616 A1* | 1/2014 | Furutani | G06F 3/044 345/174 |
| 2014/0267132 A1* | 9/2014 | Rabii | G06F 3/0418 345/174 |
| 2015/0002446 A1* | 1/2015 | Ayzenberg | G06F 3/044 345/174 |
| 2016/0011687 A1* | 1/2016 | Ding | G06F 3/044 345/174 |
| 2016/0103358 A1* | 4/2016 | Tanaka | G06F 3/0412 349/12 |
| 2016/0253001 A1* | 9/2016 | Sugita | G06F 3/044 345/174 |
| 2017/0192451 A1* | 7/2017 | Choi | G06F 1/1601 |
| 2017/0221430 A1* | 8/2017 | Tari | G09G 3/3611 |

\* cited by examiner

TOUCHSCREEN PANEL WITH HEATING FUNCTION

TECHNICAL FIELD

The disclosure relates to a touchscreen panel with a heating function.

BACKGROUND

A touchscreen is an input device normally layered on the top of an electronic visual display of an information processing system. The touchscreen enables the user to interact directly with what is displayed, rather than using a mouse, touchpad, or any other intermediate device. Generally, a user can give input or control the information processing system through simple or multi-touch gestures by touching the screen with a special stylus/pen and-or one or more fingers. Some touchscreens require ordinary or specially coated gloves to work while others use a special stylus/pen only. The user can employ the touchscreen to react to what is displayed and to control how it is displayed—for example, zooming to increase the text size.

Touchscreens generally use either resistive or capacitive technology to sense touch. A resistive technology-based touchscreen typically employs two transparent electrically-resistive layers separated by a thin gap. A voltage is applied to one of the two layers. When a top layer is touched, it deflects and locally connects with the lower layer, thus permitting the lower layer to detect the touch. The capacitive technology is based on capacitive coupling that uses human body capacitance as input. Capacitive sensors detect anything that is conductive or has a dielectric that is distinct from air. A capacitive touchscreen panel typically consists of an insulator such as glass, coated with a transparent conductor such as indium tin oxide (InSnO) or ITO. As the human body is also an electrical conductor, touching the surface of the screen results in a distortion of the screen's electrostatic field, measurable as a change in capacitance. Different technologies may be used to determine the location of the touch, which is then communicated to a controller for processing.

Touchscreens are common in devices such as game consoles, personal computers, tablet computers, electronic voting machines, and smartphones. Touchscreens can also be attached to computers or, as terminals, to networks. Touchscreens also play a prominent role in the design of digital appliances such as personal digital assistants (PDAs) and some books (E-books). Contemporary vehicles also use touchscreens to provide user interface with the vehicles' infotainment systems. Touchscreens typically use flat panel liquid-crystal displays (LCDs) for the light modulating properties of liquid crystals.

SUMMARY

One embodiment of the present disclosure is a touchscreen panel configured to accept an input touch command. The touchscreen panel includes a liquid crystal display (LCD) layer. The touchscreen panel also includes a touch sensor having a receiving element and a transmitting element, each arranged on the LCD layer. The receiving element and the transmitting element together are configured to detect an impending touch of the touch sensor via a hover system and a touch event in a touch-detecting mode. When the impending touch of the touch sensor is not detected, at least one of the receiving element and the transmitting element is configured to operate in a heating mode, as a heating element. The resultant heating element generates a heat energy input to the LCD layer and accelerates responsiveness of the LCD layer to the touch event when the impending touch of the touch sensor is not detected.

The touchscreen panel may include a temperature sensor configured to detect a temperature of the LCD layer. In such a case, the heating element is additionally configured to generate the heat energy input to the touch sensor in the heating mode when the detected temperature of the LCD layer is below a predetermined value The temperature sensor can be arranged on the touch sensor.

The touch sensor can be additionally configured to switch from the heating mode to the touch-detecting mode, if the impending touch of the touch sensor is detected or the temperature of the LCD layer is at or above the predetermined value.

The touchscreen panel can also include a conducting element. In such a case, the touch sensor can be in electric communication, via the conducting element, with a power management integrated circuit (PMIC) configured to receive electrical current from a power supply and regulate the voltage across the heating element to generate the heat energy input to the LCD layer The PMIC can selectively switch the heating element on in response to the detected temperature of the touch sensor being lower than the predetermined value and switch the heating element off in response to the detected temperature of the touch sensor being at or above the predetermined value The PMIC can also modulate the voltage across the heating element progressively or gradually in response to the detected temperature of the touch sensor. In other words, the voltage can be tapered off as the detected temperature increases up to the predetermined value.

The LCD layer can be coated with a transparent conductor configured to detect the touch event via a change in capacitance of the conductor, i.e., using capacitive technology.

The touchscreen panel can be a control and a display panel for an infotainment system integrated into a vehicle.

Another embodiment of the present disclosure is a method of controlling a touchscreen panel having an LCD layer. The method includes detecting a temperature of the LCD layer via a temperature sensor. Similar to the first embodiment, the touchscreen panel includes a touch sensor having a receiving element and a transmitting element, each arranged on the LCD layer and together configured to detect an impending touch of the touch sensor via a hover system and a touch event in a touch-detecting mode. Also, the receiving element and/or the transmitting element is configured to operate as a heating element by generating a heat energy input to the LCD layer in a heating mode when the impending touch of the touch sensor is not detected.

The method also includes scanning for the impending touch of the touch sensor via the hover system. The method additionally includes assessing, via a controller, if the impending touch of the touch sensor has been detected via the hover system and if the detected temperature of the LCD layer is below a predetermined value. The method also includes switching, via a power management integrated circuit (PMIC) in operative communication with the controller, from the touch-detecting mode to a heating mode.

In the heating mode, a heat energy input is generated to the LCD layer, if the impending touch of the touch sensor has not been detected and the assessed temperature of the LCD layer is below a predetermined value. The method additionally includes regulating, in the heating mode, via the PMIC, a voltage across the heating element to thereby generate the heat energy input to the LCD layer and accelerate responsiveness of the LCD layer to the touch event.

The method may additionally include switching, via the PMIC, from the heating mode to the touch-detecting mode, if the impending touch of the touchscreen is detected or the temperature of the LCD layer is at or above the predetermined value.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
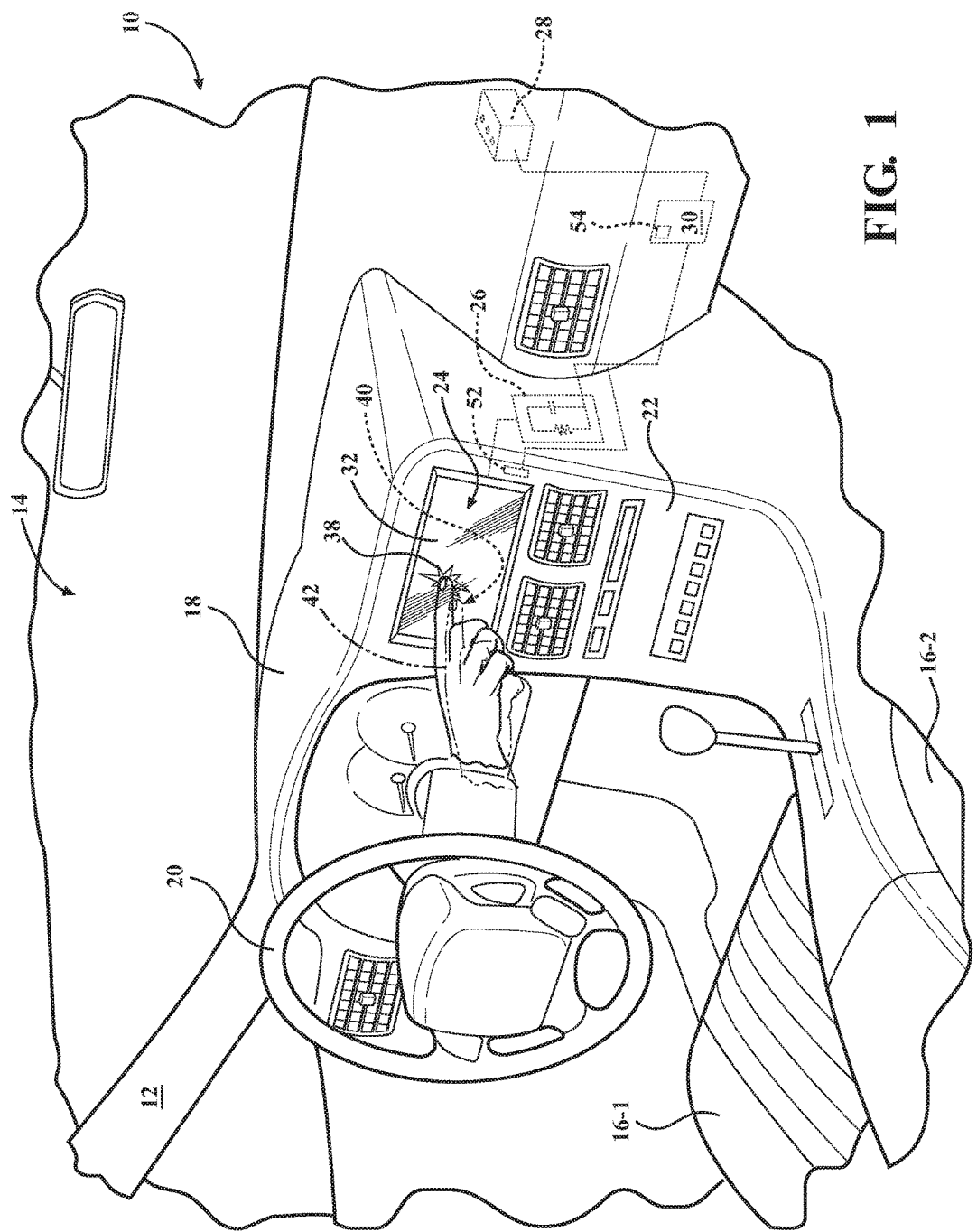
FIG. 1 is a schematic partial perspective illustration of a vehicle interior employing an embodiment of a liquid crystal display (LCD) touchscreen panel arranged on a center stack as an operator control interface for the vehicle's infotainment system.

Referring to the drawings, wherein like reference numbers refer to like components, FIG. 1 illustrates a vehicle 10 that includes a vehicle body 12 that defines a vehicle interior or passenger compartment 14. As can be seen in FIG. 1, the passenger compartment 14 includes front seats 16-1 and 16-2, such as for a vehicle operator and a passenger, a dashboard 18, and a vehicle steering wheel 20. The passenger compartment 14 also includes a center console or stack 22 providing space for various controls and storage generally in the center of the vehicle's interior, between the front seats 16-1 and 16-2.

As shown, the center stack 22 includes a liquid crystal display (LCD) touchscreen panel 24 configured as a central control and a display panel for the vehicle's audio, climate control, navigation, and other comfort and convenience systems, a.k.a., vehicle infotainment system. Generally, the LCD touchscreen panel 24 is integrated into the vehicle interior 14 and configured as a control and a display panel layered on the top of an electronic visual display for an information processing or computing system. Although the present disclosure will concentrate on the LCD touchscreen panel 24 as used to accept input touch commands in the passenger compartment 14 environment of the vehicle 10, the LCD touchscreen panel may be used in a variety of applications, ranging from mobile communication devices to personal computers.

As shown, the LCD touchscreen panel 24 is in electric communication with a power management integrated circuit (PMIC) 26. As understood by those skilled in the art, a PMIC can be used to perform various functions related to power requirements, i.e., configured to function as a multiplexer that switches systems in and out, from one logic state to another. In general, a PMIC may have one or more of the following functions: DC-to-DC conversion, battery charging, power source selection, selection, voltage scaling, power sequencing, and other miscellaneous functions. The PMIC 26 can be arranged in the center stack 22 and configured to receive electrical current from a power supply or energy storage device 28, such as a battery, which can be a 12V source. The energy storage device 28 can be arranged anywhere on the vehicle body 12. As shown, an electronic controller 30 is electrically connected to each of the PMIC 26 and the energy storage device 28.

The controller 30 is configured, i.e., constructed and programmed, to regulate the LCD touchscreen panel 24 and the PMIC 26. The controller 30 may be configured as a central processing unit (CPU) configured to regulate operation of various systems on-board the vehicle 10, such as a vehicle powertrain (not shown), or a dedicated controller. To appropriately control operation of the LCD touchscreen panel 24 and the PMIC 26, the controller 30 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 30 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 30 may also include an auxiliary storage card, hard disk, magnetic tape, any other magnetic medium, a CD-ROM, DVD, any other optical medium, etc. The controller 30 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 30 or accessible thereby may be stored in the memory and automatically executed to provide the required functionality.

Figure 2:
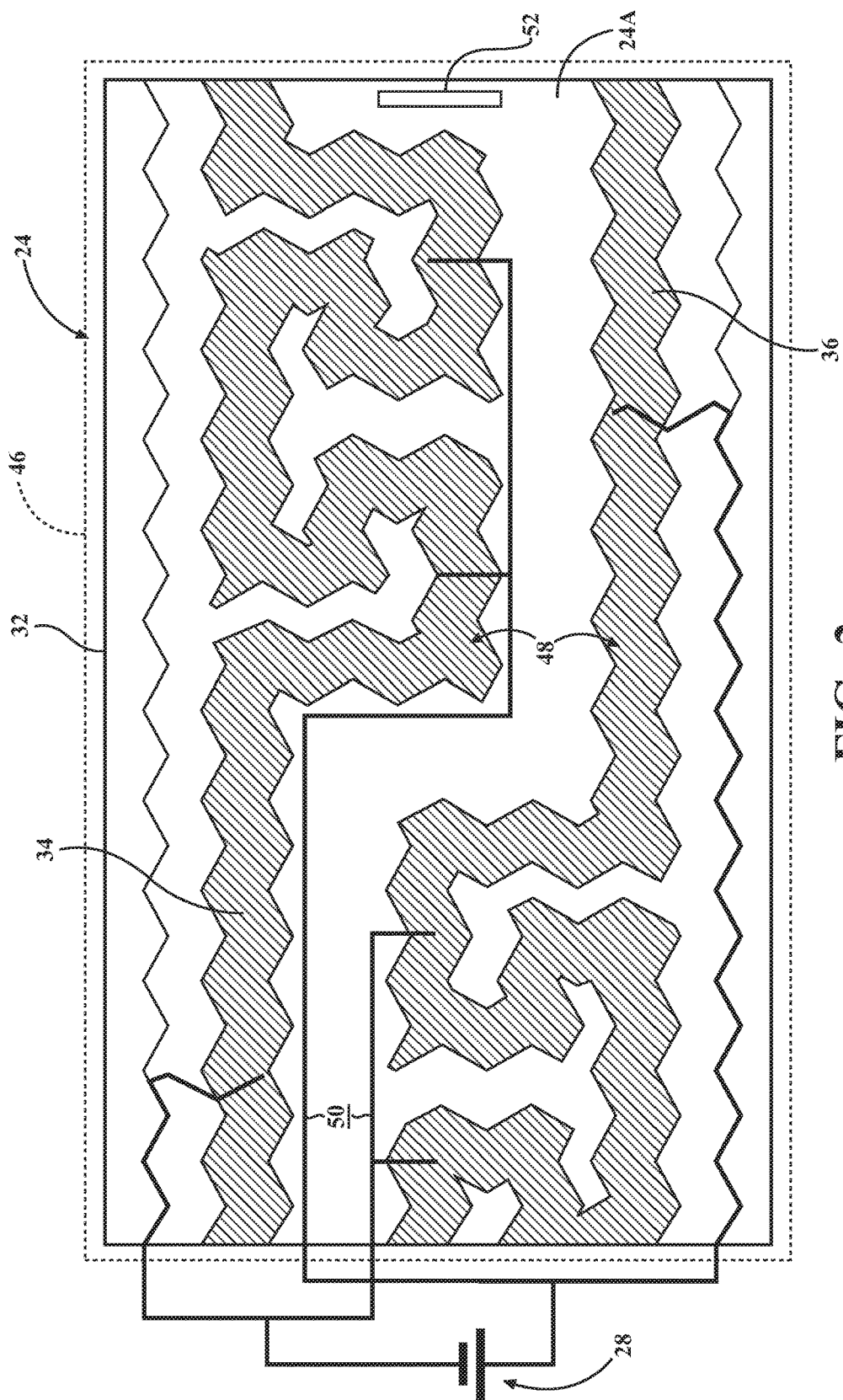
FIG. 2 is a schematic magnified illustration of a top view of a touch sensor for the touchscreen panel shown in FIG. 1, wherein the touch sensor includes a receiving element, a transmitting element, and a heating element, all arranged on a common LCD layer.

As shown in FIG. 2, the LCD touchscreen panel 24 includes an LCD layer 24A and a touch sensor 32, which can be configured as a transparent conductor arranged on the LCD layer. The touch sensor 32 has a receiving electrode or element 34 and a transmitting electrode or element 36, to be described in detail below, which together form the key elements necessary for capacitive touch sensing. In other words, the LCD touchscreen panel 24 can employ capacitive technology, as understood by those skilled in the art. According to the disclosure, the receiving element 34 and the transmitting element 36 are configured to establish mutual capacitance therebetween to detect a touch event 38 of the touch sensor 32, i.e., a tactile input command, in a touch-detecting mode. Consequently, both the receiving element 34 and the transmitting element 36 of the touch sensor 32 are arranged on the common LCD layer 24A. The receiving element 34 and the transmitting element 36 together also include a hover system 40 configured to scan for and detect an impending touch 42 (shown via phantom outline of an operator hand) of the touch sensor 32, as understood by those skilled in the art.

A change in the mutual capacitance established by the receiving element 34 and the transmitting element 36 occurs due to the presence of, for instance, a human finger, and signifies the touch event 38. The mutual capacitance also changes when such a finger is in proximity to, or hovers near, the receiving element 34 and the transmitting element 36, and this hover event can be used to signify imminent or impending physical touch 42 of the touch sensor 32. The controller 30 is configured to detect a change in the mutual capacitance of the touch sensor 32 and, in response, regulate the LCD touchscreen panel 24. The receiving element 34 and the transmitting element 36 can be supported by a separate carrier substrate which would in turn be fixed, e.g., laminated or glued, to a transparent substrate 46, such as glass or plastic. Alternatively, the receiving element 34 and the transmitting element 36 can be directly carried or supported by the transparent substrate 46.

Typically, liquid crystals are composed of rod-like molecules in nematic phase—with the long axes of neighboring molecules aligned approximately to one another. Such an anisotropic structure is generally described by a dimensionless unit vector called the "director", which is introduced to represent the direction of preferred orientation of molecules in the neighborhood of any particular point. Both electric and magnetic fields can be used to induce changes in the director. The magnitude of the fields, as well as the speed at which the molecules align, can be critical characteristics to the specific application of a liquid crystal system. Special surface treatments can be used in liquid crystal devices to force specific orientations of the director.

The ability of the liquid crystal system director to align along an external field is caused by the electric nature of the constituent molecules. Permanent electric dipoles result when one end of a molecule has a net positive charge while the other end has a net negative charge. When an external electric field is applied to the liquid crystal, the dipole molecules tend to orient themselves along the direction of the field. However, low temperature environments can result in loss of brightness and significantly slower response times of liquid crystal systems. In severe sub-zero environments, a liquid crystal system may cease to function altogether.

To counteract response and brightness deficiencies the LCD touchscreen panel 24 can experience at lower ambient temperatures, at least one of the receiving element 34 and the transmitting element 36 is configured to operate as a heating element, generally designated by numeral 48, for the touch sensor 32. When operated as the heating element 48, the receiving element 34 and/or the transmitting element 36 generate a heat energy input to the liquid crystal material of the LCD layer 24A. The resultant heating element 48 can be configured to operate as a resistor in which electrical power is converted into heat energy.

Figure 3:
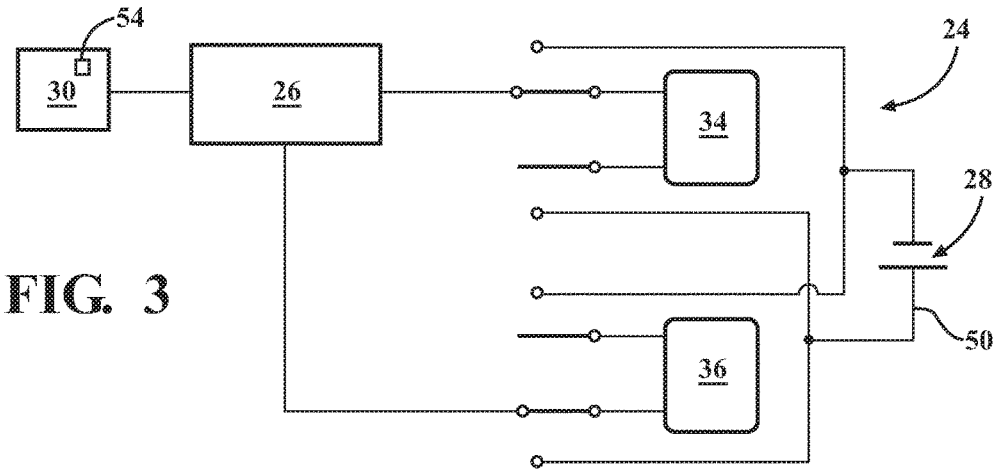
FIG. 3 is an electric circuit diagram for the touch sensor shown in FIGS. 1-2, depicting an activated touch-detecting mode.
Figure 4:
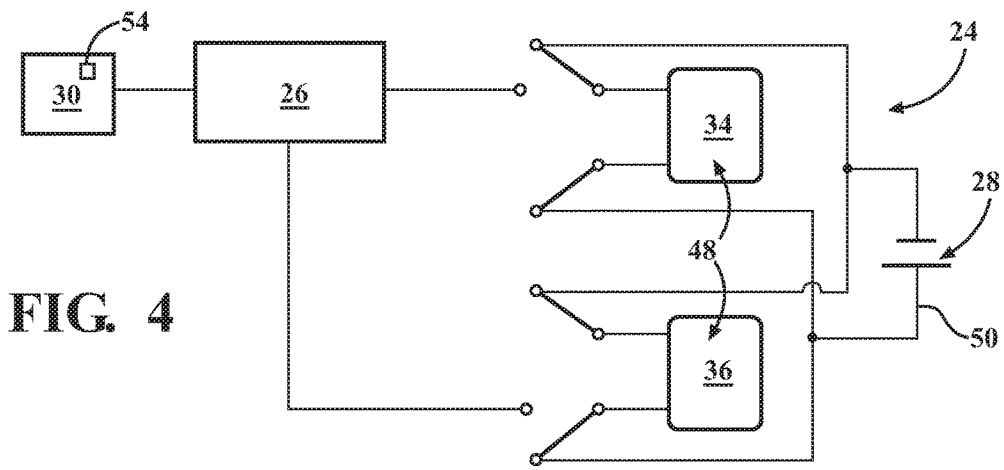
FIG. 4 is an electric circuit diagram for the touch sensor shown in FIGS. 1-2, depicting an activated heating mode.

To activate the subject heating function in the receiving element 34 and/or the transmitting element 36, a conducting element 50 can be arranged on the LCD layer 24A, as shown in FIGS. 2-4. Specifically, the conducting element 50 can be applied as a wire connection, a trace, or an impression to the LCD layer 24A to establish a switchable electric connection of one or both of the receiving element 34 and the transmitting element 36 with the PMIC 26 and the energy storage device 28. As a result, the receiving element 34 and the transmitting element 36 can be used, either together or individually, to generate the desired heating function. As can be seen in FIG. 2, the receiving element 34, the transmitting element 36, and the conducting element 50 are all positioned on the common LCD layer 24A. According to the disclosure, the resultant heating element 48 is configured to generate heat energy input to the liquid crystal material of the LCD layer 24A in a selectable or switchable heating mode. The PMIC 26 can be configured to switch between the touch-detecting mode and the heating mode of the touch sensor 32, i.e., selectively and alternately activate and deactivate the touch-detecting and heating modes.

When the receiving element 34 and/or the transmitting element 36 is operated in the subject heating mode, the effective heating element 48 is configured to increase the temperature of the liquid crystal material of the LCD layer 24A. Such an increased temperature of the LCD layer 24A is intended to shorten or minimize a response time of the liquid crystal material of the LCD layer 24A to the touch event 38. In other words, the temperature of the LCD layer 24A can be increased via the heating element 48 to accelerate responsiveness of the LCD layer 24A, especially at reduced ambient temperatures, such as near and below temperature of ice formation. According to the disclosure, the receiving element 34 and/or the transmitting element 36 is operated in the heating mode, i.e., as the heating element 48, when the impending touch 42 of the touch sensor 32 is not being detected via the hover system 40.

As shown in FIGS. 2-4, the heating element 48 can be in operative communication with a temperature sensor 52, e.g., a thermistor. The temperature sensor 52 is configured to detect a temperature of the LCD touchscreen panel 24 and, more specifically, of the LCD layer 24A. The temperature sensor 52 can be arranged on the center stack 22 and integrated into the LCD touchscreen panel 24 proximate the LCD layer 24A (as shown in FIG. 1) or affixed directly to the LCD layer (as shown in FIG. 2). When employed with the temperature sensor 52, the heating element 48 can be activated to generate the heat energy input to the LCD layer 24A in the heating mode when the detected temperature of the LCD touchscreen panel 24 or, more directly, of the LCD layer 24A is below a predetermined value 54. The predetermined value 54 can be set at 40 degrees Fahrenheit (approximately 4 degrees Celsius) and programmed into the controller 30 for subsequent regulation of the PMIC 26 and, as a result, activation of the heating element 48.

The touch sensor 32 can be additionally configured to switch from the heating mode to the touch-detecting mode, if the impending touch 42 of the touch sensor is detected via the hover system 40 or the temperature of the LCD touchscreen panel 24 is at or above the predetermined value 54. As such, the PMIC 26 can be regulated via the controller 30 to selectively switch the heating element 48 on and off in response to the detected temperature of the LCD touchscreen panel 24 being relative to the predetermined value 54. Specifically, the PMIC 26 can be configured to selectively switch the heating element 48 on in response to the detected temperature of the LCD touchscreen panel 24 being lower than the predetermined value 54 and switch the heating element off in response to the detected temperature of the touchscreen panel being at or above the predetermined value. Moreover, the PMIC 26 can also modulate the voltage across the heating element 48 progressively or gradually in response to the detected temperature of the LCD touchscreen panel 24. In other words, the PMIC 26 can taper and phase out the voltage across the receiving element 34 and/or the transmitting element 36 as the detected temperature of the LCD touchscreen panel 24 increases.

Figure 5:
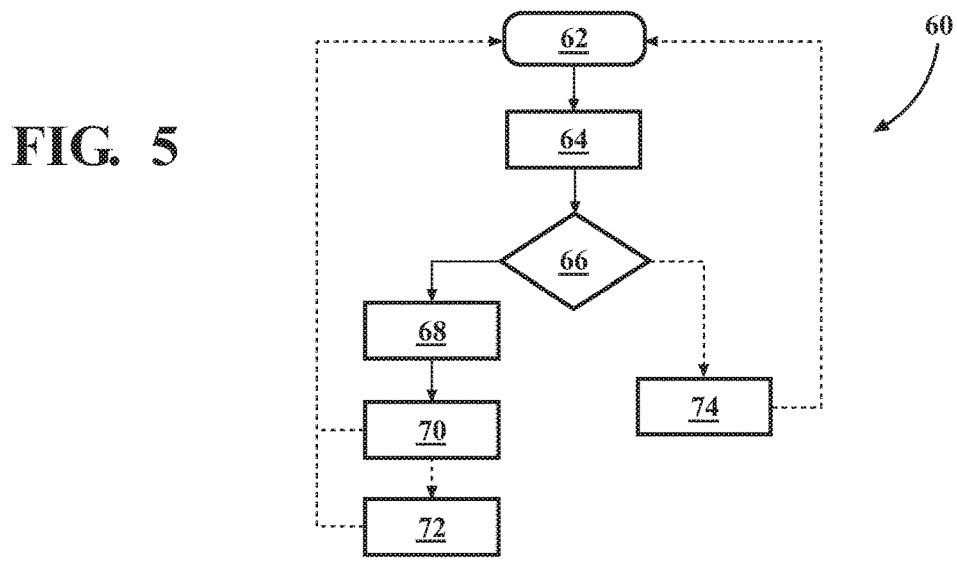
FIG. 5 is a flow diagram of a method of controlling the touchscreen panel illustrated in FIGS. 1-4.

FIG. 5 depicts a method 60 of controlling the LCD touchscreen panel 24 that includes the touch sensor 32 having the receiving element 34 and the transmitting element 36, each positioned on the common LCD layer 24A and operable as the heating element 48, as described above with respect to FIGS. 1-4. The method 60 is initiated in frame 62 with detecting a temperature of the LCD touchscreen panel 24 via the controller 30 in operative communication with the temperature sensor 52. Frame 62 may entail receiving and processing output signals from the temperature sensor 52, which the controller 30 can readily convert into a corresponding temperature, as is known in the art. Following frame 62, the method 60 proceeds to frame 64, where it includes scanning via the hover system 40 for the impending touch 42 of the LCD touchscreen panel 24. After frame 64, the method advances to frame 66.

In frame 66 the method includes assessing, via the controller 30, whether the impending touch 42 of the touch sensor 32 has been detected via the hover system 40 and whether the detected temperature of the LCD touchscreen panel 24 is below the predetermined value 54. If in frame 66 it is determined that the impending touch 42 of the touch sensor 32 has not been detected via the hover system 40 and the detected temperature of the LCD touchscreen panel 24 is below the predetermined value 54, the method proceeds to frame 68. In frame 68, the method includes switching, via the PMIC 26, from the touch-detecting mode to the heating mode, wherein the heat energy input can be generated to the LCD layer 24A via the heating element 48, i.e., via the receiving element 34 and/or the transmitting element 36. Following frame 68, the method advances to frame 70.

In frame 70 the method includes regulating, via the PMIC 26, the voltage across the heating element 48 in the heating mode to thereby generate the heat energy input to the LCD layer 24A and shorten a response time of the LCD layer to the touch event 38. After frame 70, the method may proceed to frame 72, where the method includes modulating, via the PMIC 26, the voltage across the heating element 48 progressively in response to the detected temperature of the LCD touchscreen panel 24. On the other hand, if in frame 66 it is determined that the impending touch 42 of the touch sensor 32 has been detected via the hover system 40 and/or the detected temperature of the LCD touchscreen panel is not below the predetermined value 54, the method can proceed to frame 74. In frame 74 the method includes switching from the heating mode to the touch-detecting mode. Following any of the frames 70, 72, or 74 the method may loop back to frame 62.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A touchscreen panel for accepting an input touch command, comprising:
a liquid crystal display (LCD) layer;
a touch sensor including a receiving element and a transmitting element, each arranged on the LCD layer; and
a conducting element arranged on the LCD layer, having multiple electric connections to each of the receiving element and the transmitting element along the receiving and transmitting elements' respective lengths, and configured to deliver electrical current to each of the receiving and transmitting elements;
wherein:
the receiving element and the transmitting element together are configured to establish mutual capacitance therebetween to thereby detect an impending touch of the touch sensor via a hover system and a touch event in a touch-detecting mode; and
at least one of the receiving element and the transmitting element is configured to operate as a heating element by generating a heat energy input to the LCD layer in a heating mode and accelerate responsiveness of the LCD layer to the touch event when the impending touch of the touch sensor is not detected.

2. The touchscreen panel according to claim 1, further comprising a temperature sensor arranged on the touch sensor and configured to detect a temperature of the LCD layer, and wherein the heating element is additionally configured to generate the heat energy input to the touch sensor in the heating mode when the detected temperature of the LCD layer is below a predetermined value.

3. The touchscreen panel according to claim 2, wherein the touch sensor is additionally configured to switch from the heating mode to the touch-detecting mode, if the impending touch of the touch sensor is detected or the temperature of the LCD layer is at or above the predetermined value.

4. The touchscreen panel according to claim 3, further comprising a conducting element, wherein the touch sensor is in electric communication, via the conducting element, with a power management integrated circuit (PMIC) configured to receive the electrical current from a power supply and regulate the voltage across the heating element to generate the heat energy input to the LCD layer.

5. The touchscreen panel according to claim 4, wherein the PMIC is configured to selectively switch the heating element on in response to the detected temperature of the LCD layer being lower than the predetermined value and switch the heating element off in response to the detected temperature of the LCD layer being at or above the predetermined value.

6. The touchscreen panel according to claim 5, wherein the PMIC is configured to modulate the voltage across the heating element progressively in response to the detected temperature of the LCD layer.

7. The touchscreen panel according to claim 4, wherein the conducting element is one of a wire connection, a trace, and an impression to the LCD layer, and is configured to establish a switchable electric connection of at least one of the receiving element and the transmitting element with the PMIC.

8. The touchscreen panel according to claim 1, wherein the touchscreen panel is a control and a display panel for an infotainment system integrated into a vehicle.

9. The touchscreen panel according to claim 1, wherein each of the receiving element and the transmitting element is configured as an electrode and includes an electrode portion shaped to loop and double back on the LCD layer;

and wherein the electrode portion of the receiving element shaped to loop and double back is configured to complement the electrode portion of the transmitting element shaped to loop and double back, such that the receiving element nests within the transmitting element.

10. The touchscreen panel according to claim 1, wherein solely the receiving element or solely the transmitting element is configured to operate as a heating element.

11. An information processing system comprising:
a touchscreen panel having:
- a liquid crystal display (LCD) layer;
- a touch sensor having a receiving element and a transmitting element, each arranged on the LCD layer and together configured to establish mutual capacitance therebetween to thereby detect an impending touch of the touch sensor via a hover system and a touch event in a touch-detecting mode;
- a conducting element arranged on the LCD layer, having multiple electric connections to each of the receiving element and the transmitting element along the receiving and transmitting elements' respective lengths, and configured to deliver electrical current to each of the receiving and transmitting elements; and
- a temperature sensor arranged on the touch sensor and configured to detect a temperature of the LCD layer;
- wherein at least one of the receiving element and the transmitting element is in operative communication with the temperature sensor and configured to operate as a heating element by generating a heat energy input to the LCD layer in a heating mode when the impending touch of the touch sensor is not detected and the detected temperature of the LCD layer is below a predetermined value; and
a power management integrated circuit (PMIC) configured to:
- regulate the voltage across the heating element;
- switch the touch sensor from the touch-detecting mode to a heating mode, if the impending touch of the touch sensor is not detected and the detected temperature of the LCD layer is below a predetermined value; and
- apply, in the heating mode, a voltage across the heating element to thereby generate the heat energy input to the LCD layer and accelerate responsiveness of the LCD layer to the touch event.

12. The information processing system according to claim 11, further comprising a controller in electronic communication with the touchscreen panel and configured to:
- receive a signal from the temperature sensor indicative of the detected temperature of the LCD layer;
- receive a signal from the hover system indicative of the impending touch of the touchscreen; and
- regulate the PMIC in response to the received signals from the temperature sensor and the hover system.

13. The information processing system according to claim 11, wherein the PMIC is additionally configured to switch the touchscreen from the heating mode to the touch-detecting mode, if the impending touch of the touchscreen was detected or the detected temperature of the touchscreen is at or above the predetermined value.

14. The information processing system according to claim 11, wherein the PMIC is configured to selectively switch the heating element on in response to the detected temperature of the LCD layer being lower than the predetermined value and switch the heating element off in response to the detected temperature of the LCD layer being at or above the predetermined value.

15. The information processing system according to claim 14, wherein the PMIC is configured to modulate the voltage across the heating element progressively in response to the detected temperature of the LCD layer.

16. The information processing system according to claim 11, wherein the information processing system is an infotainment system integrated into a vehicle and the touchscreen is a control and a display panel therefor.

17. A method of controlling a touchscreen panel having a liquid crystal display (LCD) layer, the method comprising:
- detecting a temperature of the LCD layer via a temperature sensor, wherein the touchscreen panel includes a touch sensor having a receiving element and a transmitting element, each arranged on the LCD layer, together configured to establish mutual capacitance therebetween to thereby detect an impending touch of the touch sensor via a hover system and a touch event in a touch-detecting mode, and at least one of the receiving element and the transmitting element is configured to operate as a heating element by generating a heat energy input to the LCD layer in a heating mode when the impending touch of the touch sensor is not detected;
- delivering electrical current to each of the receiving element and the transmitting element via a conducting element arranged on the LCD layer and having multiple electric connection along each of the receiving and transmitting elements' respective lengths;
- scanning for the impending touch of the touch sensor via the hover system;
- assessing, via a controller, if the impending touch of the touch sensor has been detected via the hover system and if the detected temperature of the LCD layer is below a predetermined value;
- switching, via a power management integrated circuit (PMIC) in operative communication with the controller, from the touch-detecting mode to the heating mode, if the impending touch of the touch sensor has not been detected and the assessed temperature of the LCD layer is below a predetermined value; and
- regulating, in the heating mode, via the PMIC, a voltage across the heating element to thereby generate the heat energy input to the LCD layer and accelerate responsiveness of the LCD layer to the touch event.

18. The method according to claim 17, further comprising switching, via the PMIC, from the heating mode to the touch-detecting mode, if the impending touch of the touchscreen is detected or the temperature of the LCD layer is at or above the predetermined value.

19. The method according to claim 17, wherein said regulating the voltage across the heating element includes selectively switching the heating element on in response to the detected temperature of the LCD layer being lower than the predetermined value and switching the heating element off in response to the detected temperature of the LCD layer being at or above the predetermined value.

20. The method according to claim 17, wherein said regulating the voltage across the heating element further includes modulating the voltage across the heating element progressively in response to the detected temperature of the LCD layer.

* * * * *